United States Patent
Chu et al.

(10) Patent No.: US 11,641,253 B2
(45) Date of Patent: May 2, 2023

(54) BANDWIDTH INDICATION, TXOP PROTECTION, AND BANDWIDTH NEGOTIATION

(71) Applicant: NXP USA, Inc., Austin, TX (US)

(72) Inventors: Liwen Chu, San Ramon, CA (US); Hongyuan Zhang, Fremont, CA (US); Huiling Lou, Sunnyvale, CA (US); Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 47 days.

(21) Appl. No.: 17/240,516

(22) Filed: Apr. 26, 2021

(65) Prior Publication Data

US 2021/0336720 A1 Oct. 28, 2021

Related U.S. Application Data

(60) Provisional application No. 63/138,627, filed on Jan. 18, 2021, provisional application No. 63/063,613, filed on Aug. 10, 2020, provisional application No. 63/048,708, filed on Jul. 7, 2020, provisional application No. 63/019,743, filed on May 4, 2020, provisional application No. 63/015,631, filed on Apr. 26, 2020.

(51) Int. Cl.
*H04L 1/00* (2006.01)
*H04L 5/00* (2006.01)
*H04W 28/20* (2009.01)

(52) U.S. Cl.
CPC ......... *H04L 1/0069* (2013.01); *H04L 5/0082* (2013.01); *H04L 5/0092* (2013.01); *H04W 28/20* (2013.01)

(58) Field of Classification Search
CPC ..... H04W 28/20; H04W 28/18; H04W 28/16; H04W 28/22; H04W 28/24; H04W 28/26; H04L 1/0069; H04L 1/0068; H04L 1/0067; H04L 5/0082; H04L 5/0078; H04L 5/008; H04L 5/0092; H04L 5/0094; H04L 5/0096; H04L 5/0091
See application file for complete search history.

(56) References Cited

U.S. PATENT DOCUMENTS

| 11,382,101 | B1 * | 7/2022 | Chu | ................... | H04W 74/002 |
| 2017/0359148 | A1 * | 12/2017 | Richardson | ........... | H04L 1/0067 |
| 2020/0037357 | A1 * | 1/2020 | Chu | ................... | H04W 56/001 |

(Continued)

OTHER PUBLICATIONS

Yee, James et al., Part 11: Wireless LAN Medium Access Control (MAC) and Physical Layer (PHY) Specifications Amendment 4: Enhancements for Very High Throughput for Operation in Bands below 6 GHz; Copyright © 2013 IEEE. All rights reserved.

*Primary Examiner* — Phong La

(57) ABSTRACT

Various embodiments relate to a method performed by a first wireless device for bandwidth negotiation for frame exchange in a TXOP with a second wireless device, including: announcing by the first wireless device a channel puncture scheme indicating whether some 20 MHz channels covering a BSS operating bandwidth are punctured or not; transmitting a frame to the second wireless device indicating a bandwidth for the frame exchange; receiving a frame from the second wireless device indicating a negotiated bandwidth for the frame exchange; and exchanging frames with the second wireless device using the negotiated bandwidth.

20 Claims, 16 Drawing Sheets

(56) References Cited

U.S. PATENT DOCUMENTS

| | | | |
|---|---|---|---|
| 2020/0076552 A1* | 3/2020 | Cherian | H04W 72/044 |
| 2020/0077421 A1* | 3/2020 | Asterjadhi | H04L 5/14 |
| 2020/0288523 A1* | 9/2020 | Patil | H04W 80/02 |
| 2021/0028897 A1* | 1/2021 | Park | H04L 5/0044 |
| 2021/0044398 A1* | 2/2021 | Noh | H04L 1/0041 |
| 2021/0127291 A1* | 4/2021 | Chen | H04L 5/0048 |
| 2021/0176785 A1* | 6/2021 | Jang | H04L 1/0068 |
| 2021/0250119 A1* | 8/2021 | Noh | H04L 1/0033 |
| 2021/0259033 A1* | 8/2021 | Kim | H04W 76/11 |
| 2021/0266890 A1* | 8/2021 | Chu | H04W 72/048 |
| 2021/0266960 A1* | 8/2021 | Lu | H04W 72/0453 |
| 2021/0336720 A1* | 10/2021 | Chu | H04L 1/0069 |
| 2021/0377856 A1* | 12/2021 | Chu | H04W 72/0446 |
| 2022/0166536 A1* | 5/2022 | Ma | H04W 72/042 |

* cited by examiner

FIG. 2C

| PARAMETER | CONDITION | B0 | B3 | B4 | B5 | B6 |
|---|---|---|---|---|---|---|
| TXVECTOR | CH_BANDWIDTH_IN_NON_HT IS PRESENT AND DYN_BANDWIDTH_IN_NOT_HT IS NOT PRESENT IN TXVECTOR | 5-BIT PSEUDORANDOM NONZERO INTEGER IF CH_BANDWIDTH_IN_NON_HT EQUALS CBW20 AND A 5-BIT PSEUDORANDOM INTEGER OTHERWISE | | | CH_BANDWIDTH_IN_NON_HT | |
| TXVECTOR | CH_BANDWIDTH_IN_NON_HT IS PRESENT AND DYN_BANDWIDTH_IN_NOT_HT IS NOT PRESENT IN TXVECTOR | 4-BIT PSEUDORANDOM NONZERO INTEGER IF CH_BANDWIDTH_IN_NON_HT EQUALS CBW20 AND DYN_BANDWIDTH_IN_NON_HT EQUALS STATIC, AND A 4-BIT PSEUDORANDOM INTEGER OTHERWISE | DYN_BANDWIDTH_IN_NON_HT | | | |
| RXVECTOR | CH_BANDWIDTH_IN_NON_HT IS PRESENT AND DYN_BANDWIDTH_IN_NOT_HT ARE PRESENT IN RXVECTOR | — | DYN_BANDWIDTH_IN_NON_HT | | (#2366)CH_BANDWIDTH_IN_NON_HT_INDICATOR (SEE TABLE 17-9 (RXVECTOR PARAMETER CH_BANDWIDTH_IN_NON_HT VALUES)). | |

FIRST 7 BITS OF SCRAMBLING SEQUENCE — TRANSMIT ORDER →

315

160MHz BSS

RTS FROM
AP TO STA1

CTS FROM
STA1 TO AP

RTS FROM
AP TO STA1

BANDWIDTH INDICATION, TXOP PROTECTION, AND BANDWIDTH NEGOTIATION

CROSS-REFERENCE TO RELATED APPLICATIONS

This application claims benefit to U.S. Provisional Patent Application Nos. 63/015631 filed on Apr. 26, 2020, 63/019,743 filed on May 4, 2020, 63/048,708 filed on Jul. 7, 2020, 63/063,613 filed Aug. 10, 2020, and 63/138,627 filed on Jan. 18, 2021, the contents of each which are hereby incorporated by reference for all purposes as if fully set forth herein.

TECHNICAL FIELD

Various exemplary embodiments disclosed herein relate generally to systems and method for bandwidth indication, TXOP protection, and bandwidth negotiation in wireless networks.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method performed by a first wireless device for bandwidth negotiation or bandwidth indication for frame exchange in a TXOP with a second wireless device, including: announcing by the first wireless device a channel puncture scheme indicating whether some channels covering a BSS operating bandwidth are punctured or not; transmitting a frame to the second wireless device indicating a bandwidth for the frame exchange; receiving a frame from the second wireless device indicating a negotiated bandwidth for the frame exchange; and exchanging frames with the second wireless device using the negotiated bandwidth.

Various embodiments are described, wherein the transmitted frame indicates that the announced channels will not be further punctured.

Various embodiments are described, wherein the bandwidth negotiation is a static bandwidth negotiation.

Various embodiments are described, wherein the bandwidth negotiation is a dynamic bandwidth negotiation.

Various embodiments are described, wherein the transmitted frame indicates that the announced channels may be further punctured.

Various embodiments are described, wherein the bandwidth negotiation is a static bandwidth negotiation.

Various embodiments are described, wherein the bandwidth negotiation is a dynamic bandwidth negotiation.

Various embodiments are described, wherein when the bandwidth negotiation is a dynamic bandwidth negotiation, the transmitted indicates that the announced channels may be further punctured.

Various embodiments are described, wherein when the bandwidth negotiation is a static bandwidth negotiation, the transmitted indicates that the announced channels will may not be further punctured.

Various embodiments are described, wherein one bit of reserved bits in a service field indicates if the bandwidth is 320/160+160 MHz's Various embodiments are described, wherein five bits of the reserved bits in the service field indicates the channel puncture scheme using U-SIG coding.

Various embodiments are described, wherein four bits of the reserved bits in the service field indicates the channel puncture scheme, for a 80 MHz frame, 4 values are used to indicate one channel being punctured and 1 value is used to indicate one 40 MHz channel being puncture, for a 160 MHz frame, 8 values are used to indicate one channel being punctured and 4 values are used to indicate one 40 MHz channel being punctured, for a 320 MHz frame with punctured 40 MHz channels or punctured 80 MHz channels, 8 values are used to indicate one 40 MHz channel being punctured and 4 values are used to indicate one 80 MHz channel being punctured, for a 320 MHz frame with punctured 120 MHz channels, 12 values are used to indicate 120 MHz being punctured.

Various embodiments are described, wherein eight bits of reserved bits in a service field indicates the channel puncture scheme wherein for a bandwidth less than or equal to 160 MHz each bit indicates where a related 20 MHz channel is punctured and for a 320 MHz bandwidth each bit indicates where a related 40 MHz channel is punctured.

Various embodiments are described, wherein the first wireless device announces a specific MAC address to indicate the that the bandwidth is greater than 160 MHz.

Various embodiments are described, wherein the transmitted frame includes an extend control frame with an extended subtype field and the transmitted frame body includes fields to indicate the bandwidth and the channel puncture scheme.

Various embodiments are described, wherein five bits in a duration field with a granularity of 32 us indicates the channel puncture scheme using U-SIG coding.

Various embodiments are described, wherein four bits of a duration field with 16 us granularity indicates the channel puncture scheme, for a 80 MHz frame, 4 values are used to indicate one 20 MHz channel being punctured and 1 value is used to indicate one 40 MHz channel being puncture, for a 160 MHz frame, 8 values are used to indicate one 20 MHz channel being punctured and 4 values are used to indicate one 40 MHz channel being punctured, for a 320 MHz frame with punctured 40 MHz channels or punctured 80 MHz channels, 8 values are used to indicate one 40 MHz channel being punctured and 4 values are used to indicate one 80 MHz channel being punctured, for a 320 MHz frame with punctured 120 MHz channels, 12 values are used to indicate 120 MHz being punctured.

Various embodiments are described, wherein eight bits of a duration field with a 256 us granularity indicates the channel puncture scheme wherein for a bandwidth less than or equal to 160 MHz each bit indicates where a related 20 MHz channel is punctured and for a 320 MHz bandwidth each bit indicates where a related 40 MHz channel is punctured.

Further various embodiments relate to a method performed by a first wireless device for bandwidth negotiation for frame exchange in a TXOP with a second wireless device, including: announcing by the first wireless device a channel puncture scheme indicating whether channels covering a BSS operating bandwidth may be dynamically punctured; transmitting a frame to the second wireless device indicating a bandwidth for the frame exchange; receiving a frame from the second wireless device indicating a negotiated bandwidth for the frame exchange and a channel puncture indication; and exchanging frames with the second wireless device using the negotiated bandwidth and the channel puncture indication.

Various embodiments are described, wherein the bandwidth negotiation is a static bandwidth negotiation with a dynamic channel puncture scheme.

Various embodiments are described, wherein the bandwidth negotiation is a dynamic bandwidth negotiation with a dynamic channel puncture scheme.

Various embodiments are described, wherein the bandwidth negotiation is a static bandwidth negotiation with a static channel puncture scheme.

Various embodiments are described, wherein the bandwidth negotiation is a dynamic bandwidth negotiation with a static channel puncture scheme.

Further various embodiments relate to a first wireless device configured to perform a bandwidth negotiation for frame exchange in a TXOP with a second wireless device, including: a processor; and a network interface connected to the processor, wherein the network interface is configured to: announce by the first wireless device a channel puncture scheme indicating whether some channels covering a BSS operating bandwidth are punctured or not; transmit a frame to the second wireless device indicating a bandwidth for the frame exchange; receive a frame from the second wireless device indicating a negotiated bandwidth for the frame exchange; and exchange frames with the second wireless device using the negotiated bandwidth.

BRIEF DESCRIPTION OF THE DRAWINGS

In order to better understand various exemplary embodiments, reference is made to the accompanying drawings, wherein:

FIG. 2C illustrates the contents of the seven bits of the scrambling sequence;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
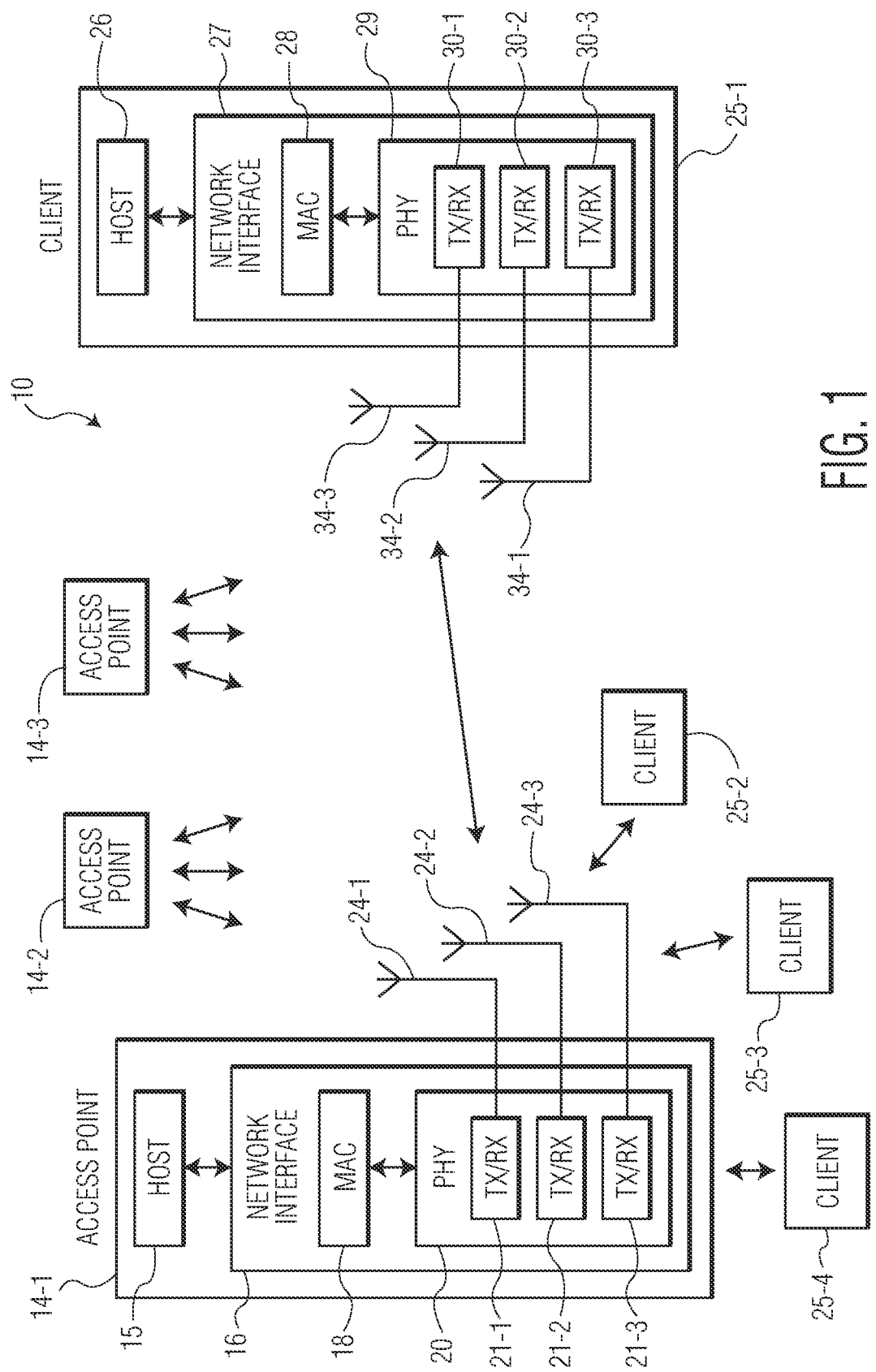
FIG. 1 is a block diagram of an example wireless local area network (WLAN) 10, according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams. Also, the client stations 25 are configured to receive data streams that are transmitted simultaneously by multiple APs 14. Likewise, the client stations 25 may transmit data streams simultaneously to the multiple APs 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

Figure 2A:
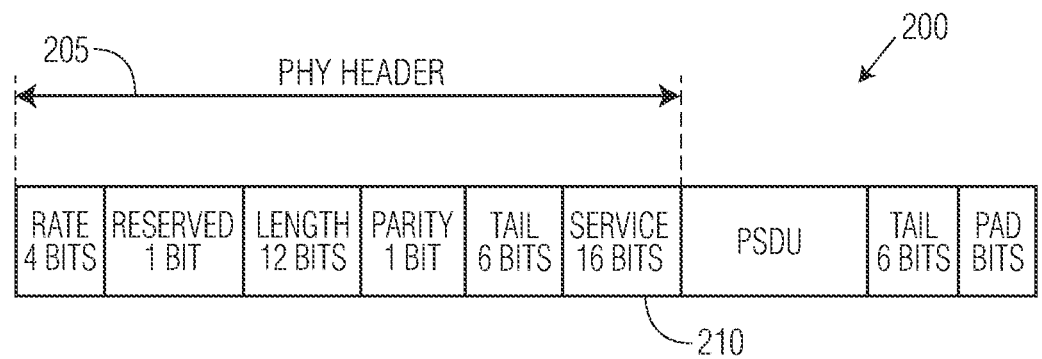
FIG. 2A illustrates a legacy PPDU.
Figure 2B:
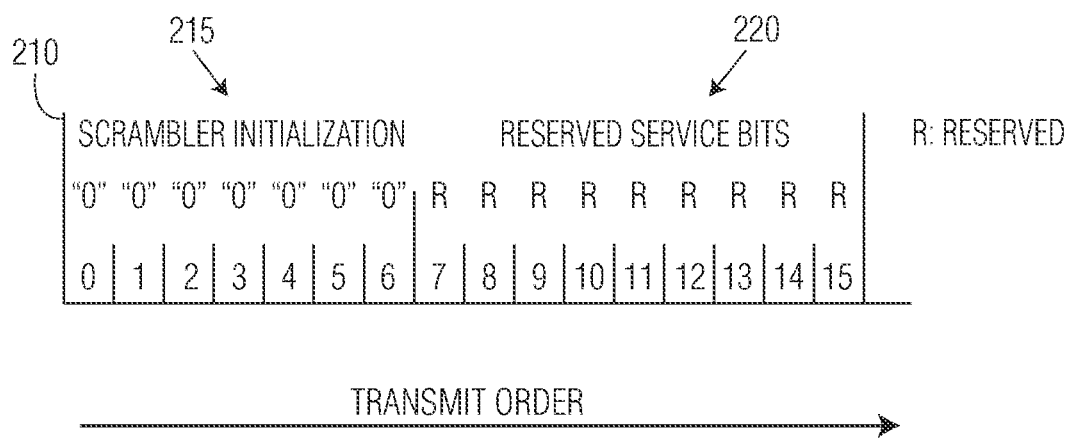
FIG. 2B illustrates the bits of the service field.

802.11ac introduces static/dynamic bandwidth (BW) negotiation and transmit opportunity (TXOP) protection through request to send (RTS)/clear to send (CTS) in non-HT duplicate PHY protocol data unit (PPDU). 802.11ac also introduces BW indication in soliciting control frames (PS Poll, Block Ack Request, NDP Announcement) in non-HT duplicated PPDU. A BW signaling transmitter address (TA) and the service field are used to carry BW information and optionally to indicate whether static BW negotiation or dynamic BW negotiation should be done. FIG. 2A illustrates a legacy PPDU. The PPDU 200 includes a PHY header 205 that includes the service field 210. FIG. 2B illustrates the bits of the service field. The service field 210 includes 16 bits.

The first seven bits are the scrambler initiation bits 215. The last nine bits are the reserved service bits 220. FIG. 2C illustrates the contents of the seven bits of the scrambling sequence. The first column of the table 215 lists the parameter, and the second column of the table 215 shows possible conditions related to the parameter. The remaining columns show the various bits and their use. For example, table 215 illustrates that bits B4, B5, and B6 indicate whether dynamic BW negotiation is available.

Figure 3A:
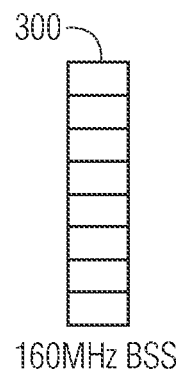
FIG. 3A illustrates a bandwidth of 160 MHz operating channel for the basic service set (BSS)
Figure 3B:
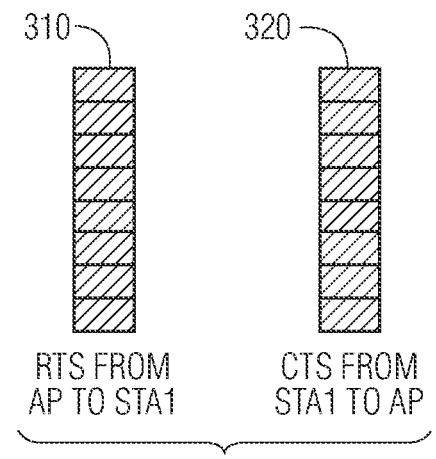
FIG. 3B illustrates a first example of static bandwidth negotiation.
Figure 3C:
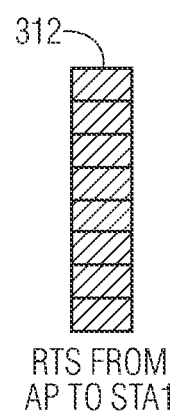
FIG. 3C illustrates a second example of static bandwidth negotiation.

Examples of static and dynamic BW negotiation will now be shown. FIG. 3A illustrates a bandwidth of 160 MHz operating channel for the basic service set (BSS). The bandwidth includes eight 20 MHz channel. FIG. 3B illustrates a first example of static bandwidth negotiation. During a TXOP, an AP send an RTS 310 to a station STA1 using a PPDU. In response, STA1 sends back a CTS 320 using a PPDU to the AP indicating that the 160 MHz BW is clear because each of the 20 MHz channels are idle. AP can now transmit frames such as a MAC protocol data unit (MPDU) using 160 MHz within the remaining time of the TXOP. FIG. 3C illustrates a second example of static bandwidth negotiation. During a TXOP, the AP sends an RTS 312 to STA1. In this case, STA1 does not send a CTS because the $5^{th}$ 20 MHz channel is busy, hence no communication between the AP and STA1 is available.

Figure 3D:
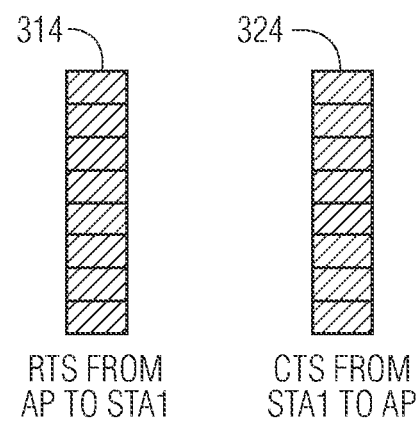
FIG. 3D illustrates a first example of dynamic BW negotiation.

FIG. 3D illustrates a first example of dynamic BW negotiation. During a TXOP, the AP sends an RTS 314 to STA1. In response, STA1 sends bask CTS 324 to the AP indicating that the 160 MHz BW is clear because each of the 20 MHz channels are idle.

Figure 3E:
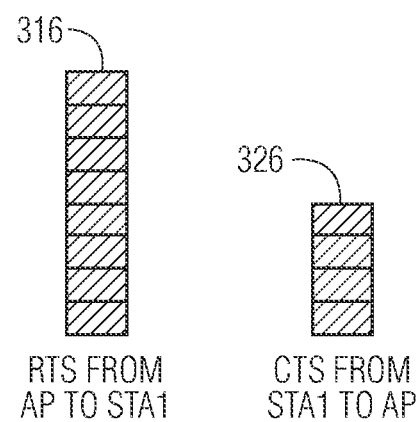
FIG. 3E illustrates a second example of dynamic BW negotiation.

FIG. 3E illustrates a second example of dynamic BW negotiation. During a TXOP, the AP sends an RTS 316 to STA1. In this case, STA1 sends back a CTS 326 to the AP indicating that 80 MHz is available because the $5^{th}$ 20 MHz channel is busy at STA1.

In 802.11ac, BW information may be found in other control frames besides RTS and CTS. For example, the following control frames also use BW signaling TA and Service field to carry the BW information: contention free end (CF-End); block ACK request (BAR); null data packet announcement (NDPA); and power saving poll (PS-Poll). Note, the information in these frames are just for BW indication and not for BW negotiation. Therefore, the responding device will use the BW specified in the response frame. For example, a block ACK request BA uses 80 MHz, then the BAR in response will use 80 MHz.

In 802.11ac and 802.11ax no 20 MHz channel can be statically punctured.

Figure 4A:
FIG. 4A illustrates a 160 MHz BSS operating channel 400 with the $3^{rd}$ 20 MHz channel being punctured.
Figure 4B:
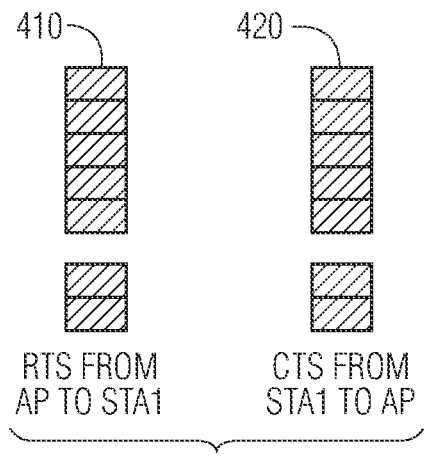
FIG. 4B illustrates static channel puncture in EHT.

EHT supports 320 MHz and dynamic and static puncture. FIG. 4A illustrates a 160 MHz BSS operating channel 400 with the $3^{rd}$ 20 MHz channel being punctured. FIG. 4B illustrates static channel puncture in EHT. The AP sends a RTS 410 with the $3^{rd}$ 20 MHz channel being punctured as indicated in EHT Operation element to negotiate BW with STA1. In response, STA1 sends a CTS 420 back to the AP indicating the use of the 160 MHz BW with the $3^{rd}$ 20 MHz channel being punctured as indicated in EHT Operation element. The AP may then send frames such as an MPDU using the 160 MHz BW but with the $3^{rd}$ 20 MHz channel not being used as it is punctured in the remaining time of the TXOP.

Figure 4C:
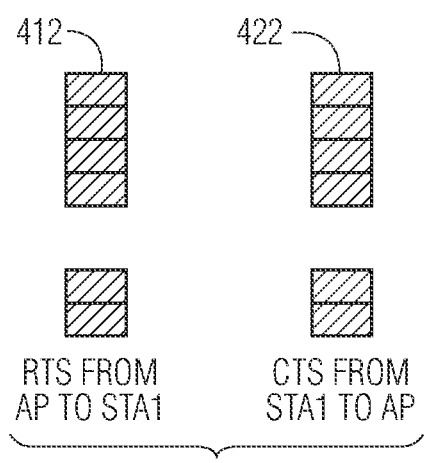
FIG. 4C illustrates dynamic channel puncture in EHT.

FIG. 4C illustrates dynamic channel puncture in EHT. The AP sends a RTS 412 to negotiate BW with STA1. RTS 412 shows the use of 160 MHz with the $3^{rd}$ and $4^{th}$ 20 MHz channels being punctured. Because dynamic puncturing is allowed the $4^{th}$ 20 MHz channel may be punctured in addition to the $3^{rd}$ 20 MHz channel that was statically indicated as allowing puncturing. In response, STA1 sends a CTS 422 back to the AP indicating the use of the 160 MHz BW with the $3^{rd}$ and $4^{th}$ 20 MHz channels being punctured. The AP may then send frames such as an MPDU using the 160 MHz BW but with the $3^{rd}$ and $4^{th}$ 20 MHz channels not being used as they are punctured.

Various options for specifying BW indication and BW negotiation types will now be described.

A first option includes BW Indication and no dynamic channel puncture. The EHT operation element announces the static channel puncture information besides the BSS operating BW information. This may be done using for example a bit map that indicates which 20 MHz channels within the BSS operating BW may be punctured. The bandwidth indication in non-HT PPDU carrying control frame will indicate if 320 MHz BW operation is allowed with the TXOP. The 320 MHz indication is only allowed when 1) the BSS operating BW is 320 MHz, 2) both the initiating STA (the STA that transmits the frame) and the responding STA (the STA that receives the frame) supports 320 MHz BW. So with the BW being indicated, the 20 MHz channels announced by EHT operation element will not be further punctured in non-HT duplicate control frame. In this option, both static BW negotiation and dynamic BW negotiation are allowed, but without dynamic channel puncture.

A second option includes BW Indication and dynamic channel puncture. The EHT operation element announces the static channel puncture information besides the BSS operating BW information. The bandwidth indication in non-HT PPDU carrying control frame will indicate if 320 MHz BW operation is allowed with the TXOP. The 320 MHz indication is only allowed when 1) the BSS operating BW is 320 MHz, and 2) both the initiating STA (the STA that transmits the frame) and the responding STA (the STA that receives the frame) supports 320 MHz BW. With the BW being indicated, the available 20 MHz channels announced by EHT operation element may be further punctured in non-HT duplicate control frame. The static BW negotiation may be used with dynamic channel puncture where the responding CTS frame cannot further puncture the 20 MHz channels that are not punctured by the soliciting RTS frame. One restriction could be that the static BW negotiation with dynamic channel puncture may be only used by multi-user CTS (MU-RTS) and CTS, i.e., normal RTS that solicits CTS cannot be used.

A third option includes a second embodiment of BW Indication and dynamic channel puncture. The EHT operation element announces the static channel puncture information besides the BSS operating BW information. Again, this may be indicated by a bitstring. The bandwidth indication in non-HT PPDU carrying control frame will indicate if 320 MHz BW operation is allowed with the TXOP. The 320 MHz indication is only allowed when 1) the BSS operating BW is 320 MHz, and 2) both the initiating STA (the STA that transmits the frame) and the responding STA (the STA that receives the frame) supports 320 MHz BW. With the BW being indicated, the available 20 MHz channels announced by EHT operation element can be further punctured in non-HT duplicate Control frame. In this third option, static BW negotiation implies no dynamic channel puncture. Further, dynamic BW negotiation implies dynamic channel puncture.

The various combinations of static and dynamic BW negotiation with static and dynamic channel puncture will now be discussed. For static BW negotiation without dynamic channel puncture, the RTS/E-RTS/MU-RTS and CTS/E-CTS are used where: 1) the BW announced by the soliciting RTS/E-RTS and the solicited CTS/E-CTS are same; 2) within the BW, the 20 MHz channels being punctured by management frame (beacon, probe response, association response) announcement are also punctured; and 3) within the BW, the 20 MHz channels that are not punctured by management frame announcement are used.

For dynamic BW negotiation without dynamic channel puncture the RTS/E-RTS/MU-RTS and CTS/E-CTS are used where: 1) the BW1 announced by the solicited CTS/E-CTS is not wider than the BW2 announced by the soliciting RTS/E-RTS/MU-RTS; 2) within the BW1, the 20 MHz channels being punctured by management frame announcement are also punctured; and 3) within the BW1, the 20 MHz channels that are not punctured by management frame announcement are used.

For static BW negotiation with dynamic channel puncture, the RTS/E-RTS/MU-RTS and CTS/E-CTS are used where: 1) the BW announced by the soliciting RTS/E-RTS/MU-RTS and the solicited CTS/E-CTS are same; and 2) within the BW, the 20 MHz channels being punctured by management frame announcement are also punctured; 3) within the BW, the 20 MHz channels that are not punctured by management frame announcement can be punctured; and 4) within the BW, the 20 MHz channels that are not punctured by RTS/E-RTS/MU-RTS cannot be punctured. Another embodiment is to keep the requirements of 1) to 3) and change the requirement so that within the BW, the 20 MHz channels that are not punctured by RTS/E-RTS/MU-RTS can be punctured. Further, the MU-RTS and CTS are used where: 1) multiple CTS can be solicited; 2) the BW announced by the soliciting MU-RTS and widest BW the solicited CTS frames are same; 3) within the BW1 of each CTS, the 20 MHz channels being punctured by management frame announcement are also punctured; 3) within the BW, the 20 MHz channels that are not punctured by management frame announcement can be punctured; and 4) within the BW1 of each CTS, the 20 MHz channels that are not punctured by MU-RTS cannot be punctured.

For dynamic BW negotiation with dynamic channel puncture the RTS/E-RTS/MU-RTS and CTS/E-CTS are used where: 1) the BW1 announced by the solicited CTS/E-CTS is not wider than the BW2 announced by the soliciting RTS; 2) within the BW1, the 20 MHz channels being punctured by management frame announcement are also punctured; 3) within the BW1, the 20 MHz channels that are not punctured by management frame announcement can be punctured; and 4) within the BW1, the 20 MHz channels that are not punctured by E-RTS can be punctured.

Figure 5A:
FIG. 5A illustrates the 160 MHz BSS operating channel with static puncture of the $3^{rd}$ 20 MHz channel.
Figure 5B:
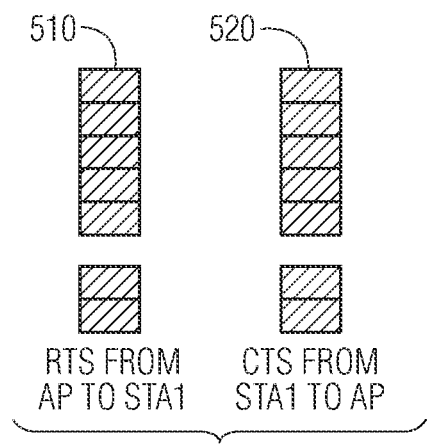
FIGS. 5B, 5C, 5D, and 5E illustrate the first frame exchange RTS/CTS of a TXOP with a first, second, third, and fourth examples of static BW negotiation.

Examples of TXOP protection and BW negotiation will now be illustrated for when no dynamic channel puncture is allowed (i.e., only static puncture is allowed). FIG. 5A illustrates the 160 MHz BSS operating channel with static puncture of the $3^{rd}$ 20 MHz channel. FIG. 5B illustrates the first frame exchange RTS/CTS of a TXOP with a first example of static BW negotiation. The AP sends a 160 MHz RTS 510 with the $3^{rd}$ 20 MHz channel punctured to STA1. In response, STA1 sends a CTS 520 back to the AP indicting a 160 MHz BW with the $3^{rd}$ 20 MHz channel being punctured.

Figure 5C:
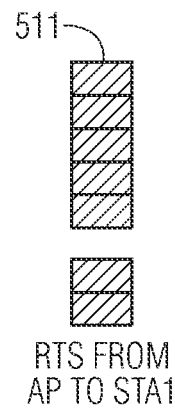

FIG. 5C illustrates the first frame exchange RTS/CTS of a TXOP with a second example of static BW negotiation. The AP sends a 160 MHz RTS 511 with the $3^{rd}$ 20 MHz channel punctured to STA1. STA1 does not respond because a $4^{th}$ 20 MHz channel is busy at STA1. As a result AP does not initiate communication with AP1.

Figure 5D:
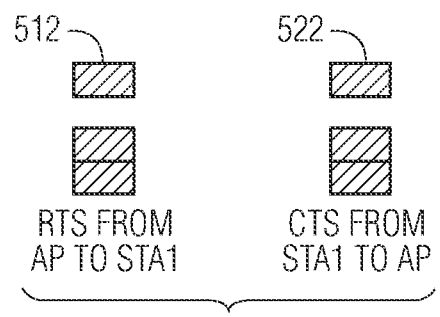

FIG. 5D illustrates the first frame exchange RTS/CTS of a TXOP with a third example of static BW negotiation. The AP sends a 80 MHz RTS 512 with the 3$^{rd}$ 20 MHz channel punctured to STA1. In response, STA1 sends a CTS 522 back to the AP indicting a 80 MHz BW with the 3$^{rd}$ 20 MHz channel being punctured.

Figure 5E:
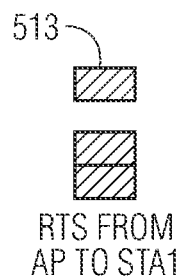

FIG. 5E illustrates the first frame exchange RTS/CTS of a TXOP with a fourth example of static BW negotiation. The AP sends a 80 MHz RTS 513 with the 3$^{rd}$ 20 MHz channel punctured to STA1. STA1 does not respond because a 4$^{th}$ 20 MHz channel is busy at STA1. As a result AP does not initiate communication with AP1.

Figure 5F:
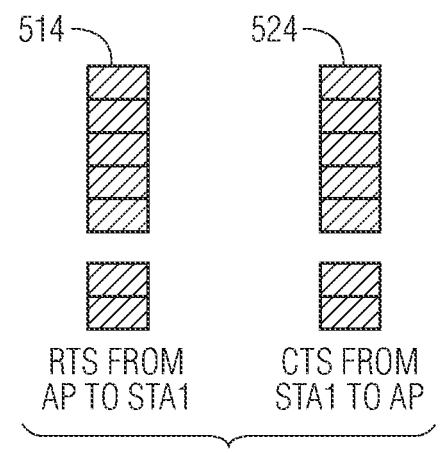
FIGS. 5F, 5G, 5H, and 5I illustrate the first frame exchange RTS/CTS of a TXOP with a first, second, third, fourth examples of dynamic BW negotiation.

FIG. 5F illustrates the first frame exchange RTS/CTS of a TXOP with a first example of dynamic BW negotiation. The AP sends a 160 MHz RTS 514 with the 3$^{rd}$ 20 MHz channel punctured to STA1. In response, STA1 sends a CTS 524 back to the AP indicting a 160 MHz BW with the 3$^{rd}$ 20 MHz channel being punctured.

Figure 5G:
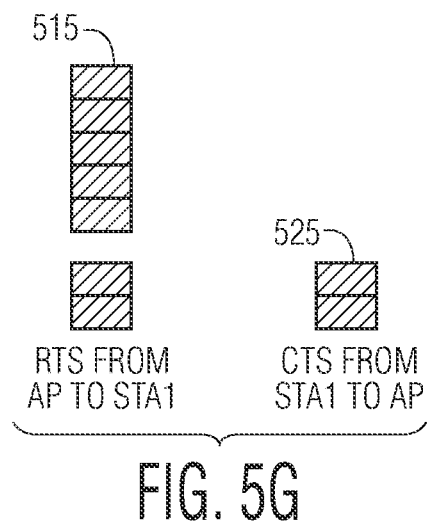

FIG. 5G illustrates the first frame exchange RTS/CTS of a TXOP with a second example of dynamic BW negotiation. The AP sends a 160 MHz RTS 515 with the 3$^{rd}$ 20 MHz channel punctured to STA1. In response, STA1 sends a CTS 525 back to the AP indicting a 40 MHz BW because the 4$^{th}$ 20 MHZ channel is busy at STA1 and the 3$^{rd}$ 20 MHz channel is punctured.

Figure 5H:
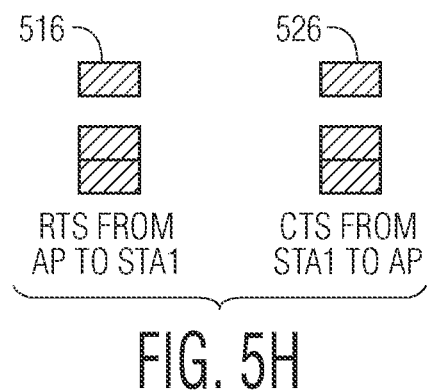

FIG. 5H illustrates the first frame exchange RTS/CTS of a TXOP with a third example of dynamic BW negotiation. The AP sends a 80 MHz RTS 516 with the 3$^{rd}$ 20 MHz channel punctured to STA1. In response, STA1 sends a CTS 526 back to the AP indicting a 80 MHz BW with the 3$^{rd}$ 20 MHz channel being punctured.

Figure 5I:
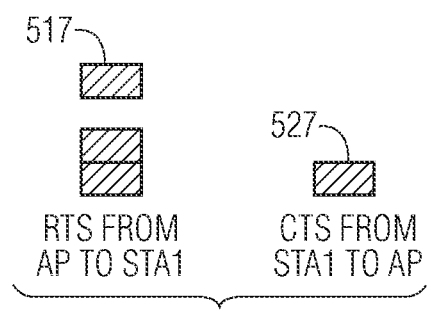

FIG. 5I illustrates the first frame exchange RTS/CTS of a TXOP with a fourth example of dynamic BW negotiation. The AP sends a 80 MHz RTS 517 with the 3$^{rd}$ 20 MHz channel punctured to STA1. In response, STA1 sends a CTS 527 back to the AP indicting a 20 MHz BW because the second 20 MHz channel is busy.

In each of the examples in FIGS. 5B, 5D, and 5F to 5I, further frames may be transmitted in a following frame using the BW indicated by the CTS. For example, a BW of 160 MHz may be used in FIGS. 5B and 5F. A BW of 80 MHz may be used in FIGS. 5D and 5H. A BW of 40 MHz may be used in FIG. 5G, and a BW of 20 MHz may be used in FIG. 5I.

Figure 6A:
FIG. 6A illustrates the 160 MHz BSS operating channel.
Figure 6B:
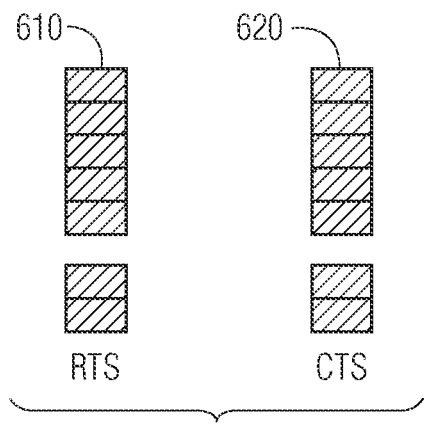
FIGS. 6B, 6C, 6D, and 6E illustrate the first frame exchange RTS/CTS of a TXOP with a first, second, third, and fourth examples of static BW negotiation.

Examples of TXOP protection and BW negotiation will now be illustrated for when dynamic channel puncture is allowed. FIG. 6A illustrates the 160 MHz BSS operating channel 600. FIG. 6B illustrates the first frame exchange RTS/CTS of a TXOP with a first example of static BW negotiation. The AP sends a 160 MHz RTS 610 with the 3$^{rd}$ 20 MHz channel punctured to STA1. In response, STA1 sends a CTS 620 back to the AP indicting a 160 MHz BW with the 3$^{rd}$ 20 MHz channel being punctured.

Figure 6C:
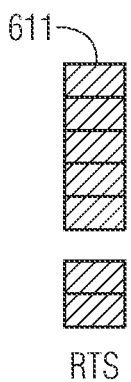

FIG. 6C illustrates the first frame exchange RTS/CTS of a TXOP with a second example of static BW negotiation. The AP sends a 160 MHz RTS 611 with the 3$^{rd}$ 20 MHz channel punctured to STA1. STA1 does not respond because a 4$^{th}$ 20 MHz channel is busy at STA1. As a result AP does not initiate communication with AP1 within the TXOP.

Figure 6D:
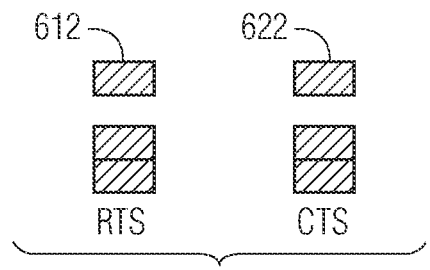

FIG. 6D illustrates the first frame exchange RTS/CTS of a TXOP with a third example of static BW negotiation. The AP sends a 80 MHz RTS 612 with the 3$^{rd}$ 20 MHz channel punctured to STA1. In response, STA1 sends a CTS 622 back to the AP indicting a 80 MHz BW with the 3$^{rd}$ 20 MHz channel being punctured.

Figure 6E:
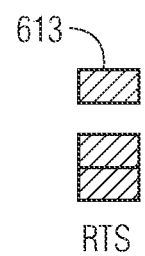

FIG. 6E illustrates the first frame exchange RTS/CTS of a TXOP with a fourth example of static BW negotiation. The AP sends a 80 MHz RTS 613 with the 3$^{rd}$ 20 MHz channel punctured to STA1. STA1 does not respond because a 4$^{th}$ 20 MHz channel is busy at STA1. As a result AP does not initiate communication with AP1.

Figure 6F:
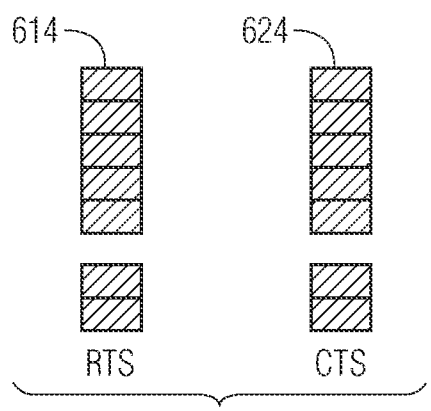
FIGS. 6F, 6G, 6H, and 6I illustrate the first frame exchange RTS/CTS of a TXOP illustrates the first, second, third, and fourth frame exchange RTS/CTS of a TXOP with a first example of dynamic BW negotiation.

FIG. 6F illustrates the first frame exchange RTS/CTS of a TXOP illustrates the first frame exchange RTS/CTS of a TXOP with a first example of dynamic BW negotiation. The AP sends a 160 MHz RTS 614 with the 3$^{rd}$ 20 MHz channel punctured to STA1. In response, STA1 sends a CTS 624 back to the AP indicting a 160 MHz BW with the 3$^{rd}$ 20 MHz channel being punctured.

Figure 6G:
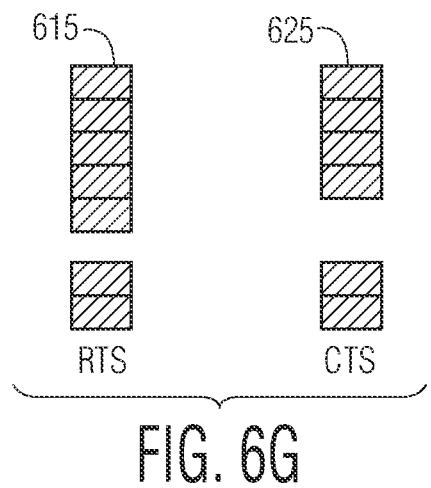

FIG. 6G illustrates the first frame exchange RTS/CTS of a TXOP with a second example of dynamic BW negotiation. The AP sends a 160 MHz RTS 615 with the 3$^{rd}$ 20 MHz channel punctured to STA1. In response, STA1 sends a CTS 625 back to the AP indicting a 80 MHz+40 MHz BW because the 4$^{th}$ 20 MHZ channel is busy at STA1 and the 3$^{rd}$ 20 MHz channel is punctured.

Figure 6H:
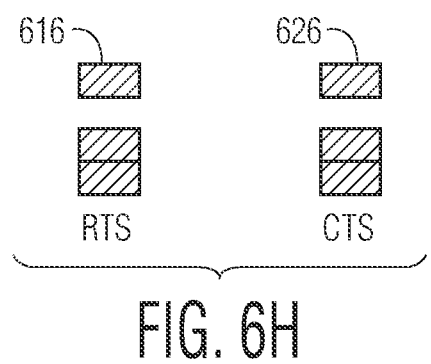

FIG. 6H illustrates the first frame exchange RTS/CTS of a TXOP with a third example of dynamic BW negotiation. The AP sends a 80 MHz RTS 616 with the 3$^{rd}$ 20 MHz channel punctured to STA1. In response, STA1 sends a CTS 626 back to the AP indicting a 80 MHz BW with the 3$^{rd}$ 20 MHz channel being punctured.

Figure 6I:
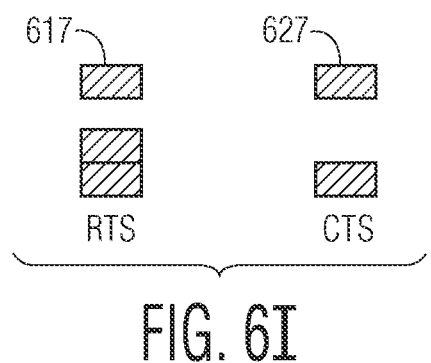

FIG. 6I illustrates the first frame exchange RTS/CTS of a TXOP with a fourth example of dynamic BW negotiation. The AP sends a 80 MHz RTS 617 with the 3$^{rd}$ 20 MHz channel punctured to STA1. In response, STA1 sends a 20 MHz+20 MHz CTS 627 back to the AP because the second 20 MHz channel is busy.

In each of the examples in FIGS. 6B, 6D, and 6F to 6I, further frames may be transmitted in the remaining time of the TXOP using the BW indicated by the CTS.

In a first option, dynamic channel puncture in non-HT duplicate PPDU is an optional feature in EHT. A STA/AP announces whether it supports BW negotiation with dynamic channel puncture. When a STA/AP announces the support of BW negotiation with dynamic channel puncture, its peer device can initiate one of the following: static BW negotiation with dynamic channel puncture; dynamic BW negotiation with dynamic channel puncture; static BW negotiation with static channel puncture; or dynamic BW negotiation with static channel puncture. When a STA/AP announces no support of BW negotiation with dynamic channel puncture, its peer device can initiate one of the following: static BW negotiation with static channel puncture; or dynamic BW negotiation with static channel puncture.

In a second option, dynamic channel puncture in non-HT duplicate PPDU is mandatory feature in EHT.

Figure 7:
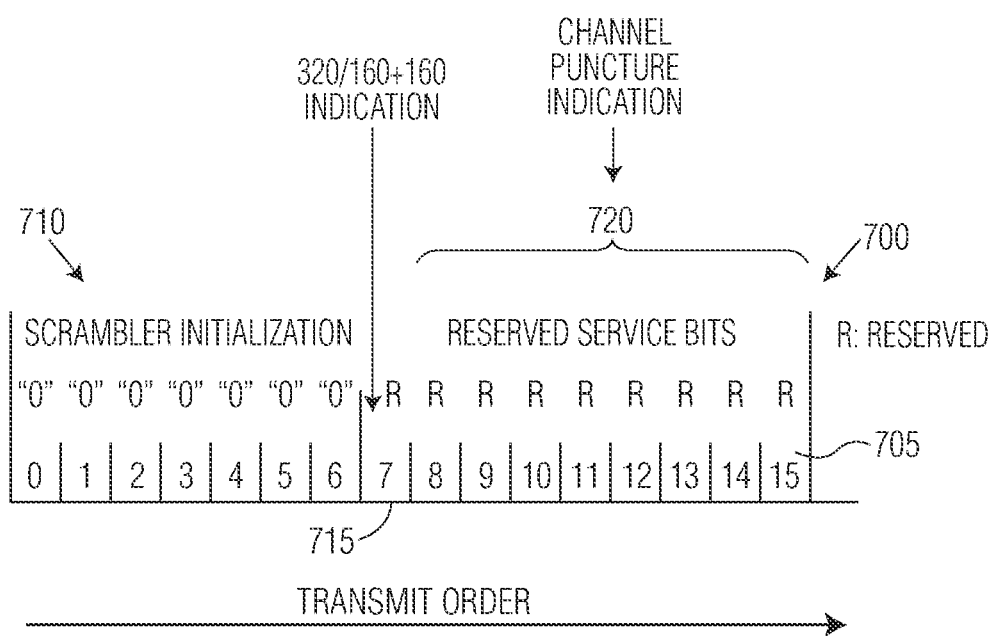
FIG. 7 illustrates the bits in the service field that includes scrambler initiation bits and reserved serviced bits and which bits may be used to indicate if the BW is 320 MHz and what channels are punctured.

In order to define the BW operation of 320 MHz and the channel puncture indication, the reserved bits in the service field may be used. FIG. 7 illustrates the bits in the service field 700 that includes scrambler initiation bits 710 and reserved serviced bits 705 and which bits may be used to indicate if the BW is 320 MHz and what channels are punctured. One bit (B7) 715 of the reserved bits is used to indicate whether the BW is 320/160+160 MHz. A value of 0 means the BW is no more than 160 MHz, and a value of 1 means the BW is 320/160+160 MHz. In non-HT duplicate PPDU that carries the initiating control frame of RTS, PS-Poll, BAR, and NDPA to another 320 MHz AP/STA, an EHT STA/AP that supports >160 MHz BW and works in a 6 GHz BSS with 320 MHz BSS operating BW uses the bit to indicate 320 MHz BW. After receiving the RTS with a 320 MHz BW indication, an EHT STA/AP that supports >160 MHz BW and works in a 6 GHz BSS with 320 MHz BSS operating BW sets the bit to 1 to indicate 320 MHz BW. The reserved bits 705 in frame control field can also provide the error protection of the reserved service field, e.g., even parity check. In another embodiment, the 320 MHz indication through 715 can be applied to other band, e.g., 5 GHz band.

To specify whether channel puncture is used, one bit can be used to indicate the existence of the channel puncture indication. A variant is that the related bits with at least one non-zero bit indicate the existence of the channel puncture indication. Options for announcing the channel puncture using the reserved bits will now be described. In a first option, 5 bits are used. The coding is same as U-SIG to signal channel puncturing patterns for single user (SU).

In a second option, 4 bits are used. For a 80 MHz non-HT duplicated PPDU, 4 values are used to indicate one 20 MHz channel being punctured, and 1 value is used to indicate one 40 MHz channel being punctured. For a 160 MHz non-HT duplicated PPDU, 8 values are used to indicate various one 20 MHz channel being punctured, and 4 values are used to indicate various one 40 MHz channel being punctured. For a 320 MHz non-HT duplicate PPDU with punctured 40 MHz or punctured 80 MHz, 8 values are used to indicate various one 40 MHz channel being punctured, 4 values are used to indicate various one 80 MHz channel being punctured. For a 320 MHz non-HT duplicate PPDU with punctured 120 MHz, 12 values are used to indicate various 120 MHz being punctured. This option needs the help from B5, B6 in the scrambler initialization bits 710 and B7 715 (two values for 320 MHz: one value for 320 MHz with channel puncture ≤80 MHz and no puncture, one value for 320 MHz with channel puncture 120 MHz).

In a third option 8 bits are used. For a BW 160 MHz, each bit indicates whether a related 20 MHz channel is punctured. For a BW of 320 MHz, each bit indicates whether a related 40 MHz channel is punctured.

The additional BW information and channel puncture indications may be provided in the MAC header.

Figure 8A:
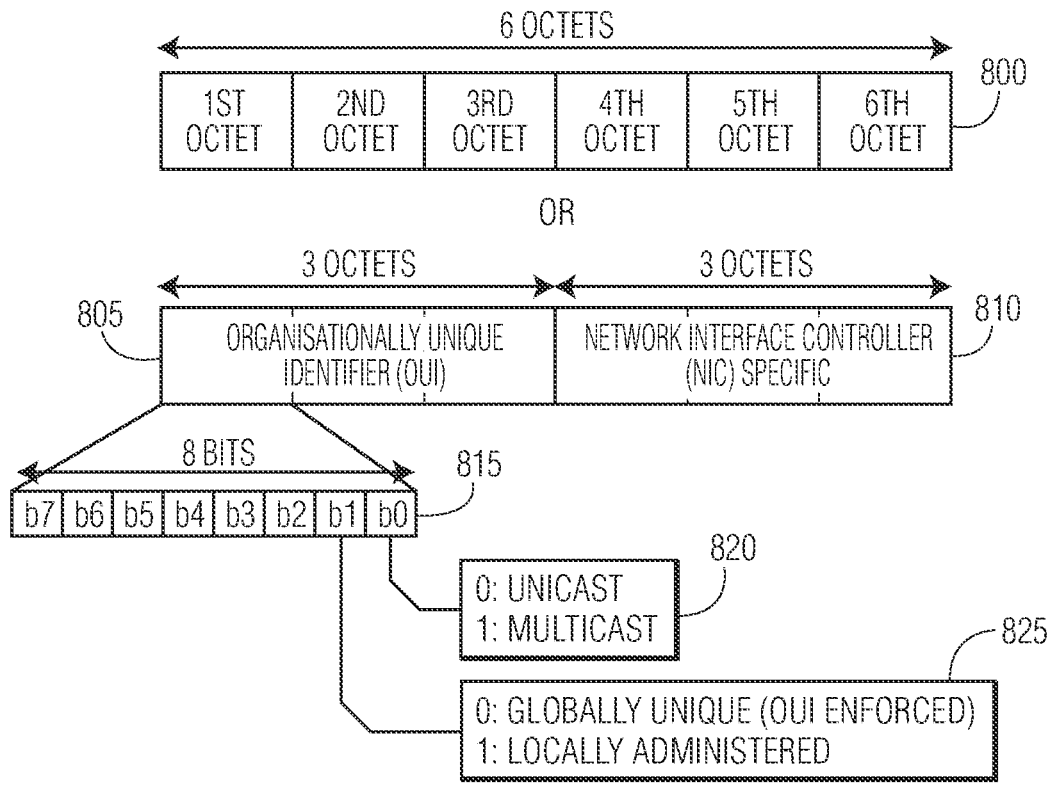
FIG. 8A illustrates the MAC address format.

A first option uses toggling the Global/Local bit (Globally unique or locally administered). FIG. 8A illustrates the MAC address format. The MAC address may include 8 octets 800. The MAC address 800 may also be thought of as the combination of a organizationally unique identifier (OUI) 805 that includes 3 octets and network interface control (NIC) specific identifier 810 that includes 3 octets. The OUI 805 includes a signaling TA 815 that includes 8 bits. Once the Global/Local bit 820 of the signaling TA 815 is toggled, the granularity of the BW information in Service field will be 40 MHz; or once the Global/Local bit 820 of the signaling TA 815 is toggled, B3 of Service field may be used as the additional BW bit.

Figure 8B:
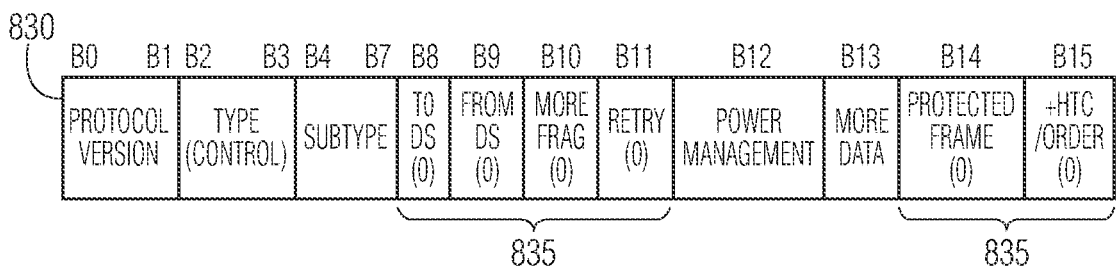
FIG. 8B illustrates a fame control field in the control frames.

In a second option, the reserved subfields in Frame Control field of Control frame indicates the additional BW information. FIG. 8B illustrates a fame control field in the control frames. The frame control field 830 includes 16 bits. The frame control field 830 includes 6 reserved bits 835 as indicated.

The additional BW information and channel puncture indications may be provided in the frame body with the frame being modified to carry this information or in the service field with the service field being extended.

Figure 9A:
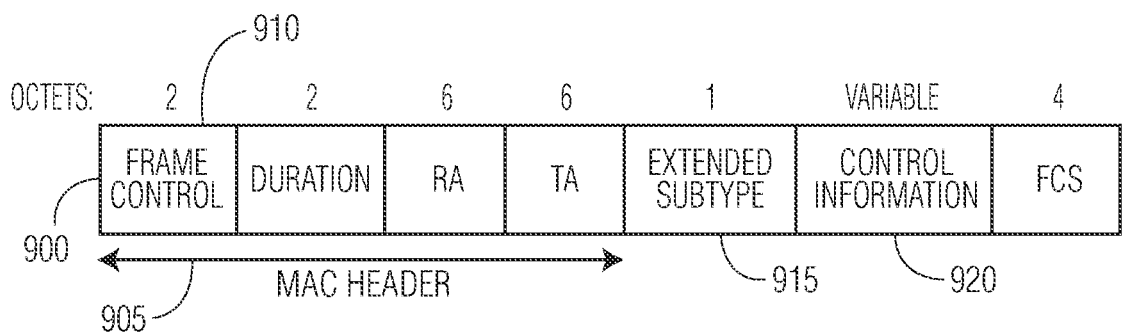
FIG. 9A illustrates an extended control frame 900 with a MAC header and a frame control field.
Figure 9B:
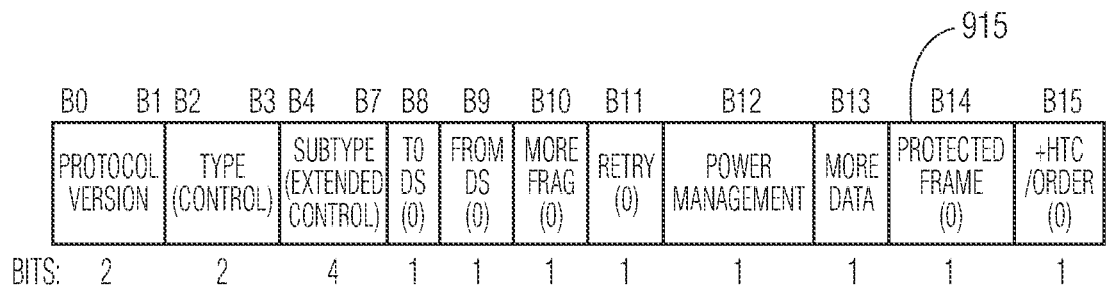
FIG. 9B illustrates the frame control field of the extended control frame.

In a first option the frame body may be used to carry the BW information and channel puncture information. Currently three Control subtypes are reserved: 0000, 0001, 1111. One of them may defined as Extended Control frame. FIG. 9A illustrates an extended control frame 900 with a MAC header 905 and a frame control field 910. An Extended Subtype field 915 is added in the Extended Control frame 900 to further indicate the new control frame, e.g., enhanced RTS, enhanced CTS, or possibly newly defined NDPA. The frame body includes the fields to indicate the BW and the punctured 20 MHz channels. FIG. 9B illustrates the frame control field of the extended control frame.

In a second option, the service field may be modified. The MU-RTS+one of normal CTS(CTS either with updated Service field or without updated Service field), E-CTS may be reused. The channel puncture may be in User Info field addressed to a STA or a specific User Info field. The Common Info field will indicate the BW of the MU-RTS, e.g., one of 20, 40, 80, 160(80+80), 320(160+160). An E-CTS or an CTS will be in the non-HT PPDU.

In a third option, the service field may be modified. A Basic Trigger+QoS Null with BQR may be used. Then dynamic BW negotiation from multiple STAs and TXOP protection occurs.

Another way to announce that a control frame carries an additional BW indicator and dynamic channel puncture is to use a specific MAC address. An EHT AP announces a specific MAC address (320 MHzPunctureBSSID) used for indicating a BW>160 MHz and/or dynamic channel puncture. The specific MAC address could be one of unused MAC address announced through a Multiple BSSID element. The specific MAC address could be a random selected address. The punctured channels are announced in other fields.

When the EHT AP transmits a control frame in a non-HT duplicate PPDU with BW>160 MHz, the TA is the specific address announced by the EHT AP. The Control frame could be RTS, CTS, BAR, or NDPA.

When an associated EHT STA transmits a control frame in a non-HT duplicate PPDU with BW>160 MHz, the RA is the specific address announced by the associated AP. The Control frame could be RTS, CTS, PS-Poll, BAR, or NDPA.

When the EHT AP transmits a control frame in a non-HT duplicate PPDU with channel puncture information, the TA is the specific address announced by the EHT AP. The Control frame could be RTS, CTS, BAR, or NDPA.

When an associated EHT STA transmits a control frame in a non-HT duplicate PPDU with channel puncture information, the RA is the specific address announced by the associated AP. The Control frame could be RTS, CTS, PS-Poll, BAR, or NDPA.

Figure 10A:
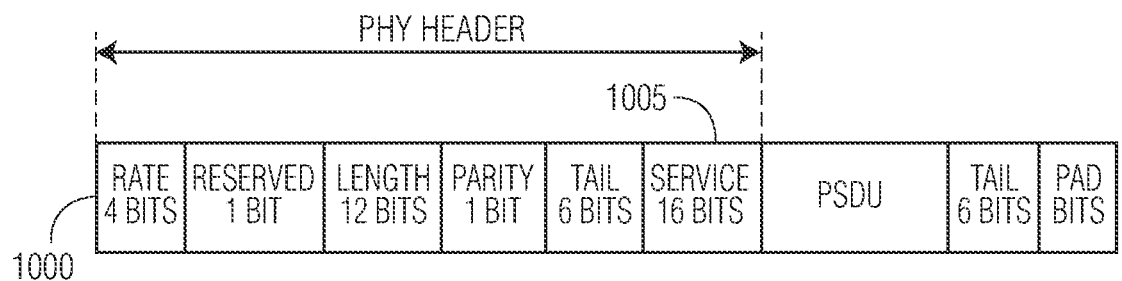
FIG. 10A illustrates a non-HT PPDU 1000 format.
Figure 10B:
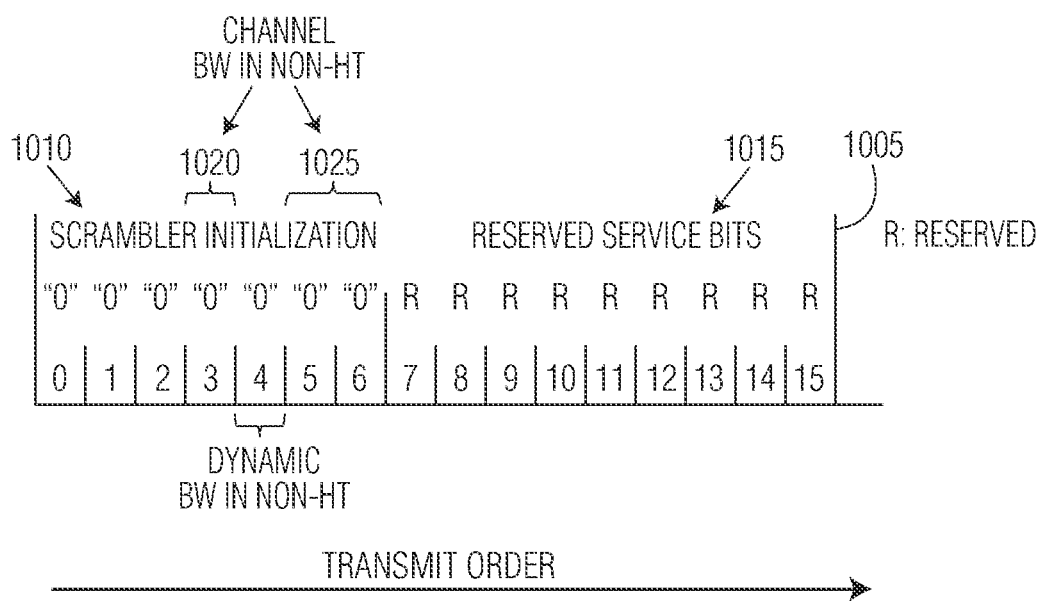
FIG. 10B illustrates a service field 1005 bit assignment.

FIG. 10A illustrates a non-HT PPDU 1000 format. The non-HT PPDU 1000 includes a service field 1005. FIG. 10B illustrates a service field 1005 bit assignment. The service field includes scrambler initiation bits 1010 and reserved service bits 1015. Further, B3 1020 of Scramble Initialization bits indicate whether a BW>160 MHz is used. When the RA or TA is the specific MAC address and B3 1020 of Scramble Initialization bits 1010 is 0, the bandwidth is 80 MHz or 160 MHz based on the values of B5 and B6 1025. The punctured channels are announced in the channel puncture indication field. When the RA or TA is the specific MAC address and B3 1010 of Scramble Initialization bits 1010 is 1, the bandwidth BW is >160 MHz based on the values of B5 and B6 1025. The punctured channels are announced in the channel puncture indication field.

When neither RA nor TA is the specific MAC address, the bandwidth is no more than 160 MHz without channel puncture. This method of >160 MHz and/or puncture indication may be combined with punctured channel announcement through Reserved SERVICE bits 1015 or combined with punctured channel announcement through a Duration field.

Various options for announcing the channel puncture in the Duration field will now be described. In a first option 5 bits are used (Duration with 32 us granularity). The coding is same as U-SIG to signal channel puncturing patterns for SU.

In a second option 4 bits are used (Duration with 16 us granularity). For a 80 MHz BW non-HT duplicated PPDU, 4 values are used to indicate various one 20 MHz channel being punctured, and 1 value is used to indicate one 40 MHz channel being puncture.

For a 160 MHz BW non-HT duplicated PPDU, 8 values are used to indicate various one 20 MHz channel being punctured, and 4 values are used to indicate various one 40 MHz channel being punctured.

For a 320 MHz BW non-HT duplicate PPDU with punctured 40 MHz channel or punctured 80 MHz channel, 8 values are used to indicate various one 40 MHz channel being punctured, 4 values are used to indicate various one 80 MHz channel being punctured. For a 320 MHz BW non-HT duplicate PPDU with punctured 120 MHz channel, 12 values are used to indicate various 120 MHz channel being punctured. This option needs the help from B3, B5, B6 in Scrambler Initialization (two values for 320 MHz BW: one value for 320 MHz BW with channel puncture 80 MHz and no puncture, one value for 320 MHz BW with channel puncture 120 MHz).

In a third option 8 bits are used (Duration with 256 us granularity). For BW 160 MHz, each bit indicates whether a related 20 MHz channel is punctured. For BW of 320 MHz, each bit indicates whether a related 40 MHz channel is punctured Various options may be used to set the Duration field. In a first option: if the granularity is 32 us, the value in 11 MSBs of Duration field is set to ceiling (the TXOP remaining duration/granularity) so that 5 LSBs of Duration field are used to indicate the channel puncture information; if the granularity is 16 us, the value in 12 MSBs of Duration field is set to ceiling (the TXOP remaining duration/granularity) so that 4 LSBs of Duration field are used to indicate the channel puncture information; and if the granularity is 265 us, the value in 8 MSBs of Duration field is set to ceiling (the TXOP remaining duration/granularity) so that 8 LSBs of Duration field are used to indicate the channel puncture information.

In a second option: if the granularity is 32 us, the value in 11 MSBs of Duration field is set to floor (the TXOP remaining duration/granularity) so that 5 LSBs of Duration field are used to indicate the channel puncture information; if the granularity is 16 us, the value in 12 MSBs of Duration field is set to floor (the TXOP remaining duration/granularity) so that 4 LSBs of Duration field are used to indicate the channel puncture information; and if the granularity is 265 us, the value in 8 MSBs of Duration field is set to floor (the TXOP remaining duration/granularity) so that 8 LSBs of Duration field are used to indicate the channel puncture information.

When one of 20 MHz channel of a TXOP for OFDMA transmission with 320 MHz/160+160 MHz is punctured dynamically, it may not be able to protect all the available 20 MHz channels. This may happen when all STAs need to cover the primary 20 MHz channel when transmitting a SU PPDU (duplicated 10 MHz PPDU or VHT/HE PPDU). The 300 MHz SU PPDU or 300 MHz MU PPDU addressed to a single STA is not allowed. When channel puncture operation is optional for EHT STAs/APs, it may not be able to protect all the available 20 MHz channels of OFDMA operation.

Various options may be used to protect a TXOP of OFMDA with (dynamic) channel puncture. In a first method with a TXOP for OFDMA transmission with channel puncture, if CTS from multiple STAs solicited by MU-RTS cannot cover all available 20 MHz channels, the AP schedules CTS in RUs to cover maximal number of 20 MHz channels. The 20 MHz channels covered by MU-RTS and the 20 MHz channels covered by the all the CTS are same. Before MU-RTS and CTS, a CTS-to-Self to cover all 20 MHz channels used for OFDMA can be transmitted.

In a second method with a TXOP for OFDMA transmission with channel puncture, if CTS from multiple STAs solicited by MU-RTS cannot cover all available 20 MHz channels, the AP schedules CTS in RUs to cover maximal number of 20 MHz channels. The 20 MHz channels covered by MU-RTS are same as the 20 MHz channels used by the OFDMA operation. The 20 MHz channels covered by MU-RTS are more than the 20 MHz channels covered by the all the CTS are same. Before MU-RTS and CTS, a CTS-to-Self to cover all 20 MHz channels used for OFDMA can be transmitted.

In a third method for the 6 GHz band, Basic Trigger+QoS Null in HE TB PPDU with value in TXOP field of HE SIG-A other than UNSPECIFIED, BQRP Trigger+QoS Null in HE TB PPDU with value in TXOP field of HE SIG-A other than UNSPECIFIED, BSRP Trigger+QoS Null in HE TB PPDU with value in TXOP field of HE SIG-A other than UNSPECIFIED are used to protect. OFDMA operation. The 20 MHz channels covered by Trigger that solicits QoS Null are same as the 20 MHz channels used by the OFDMA operation of Data frame transmission. The 20 MHz channels covered by Trigger that solicits QoS Null and the 20 MHz channels covered by the all the QoS Null are same.

In a fourth method for the 6 GHz band, Basic Trigger+QoS Null in multiple HE 1B PPDUs with a value in TXOP field of HE SIG-A other than UNSPECIFIED, BQRP Trigger+QoS Null in multiple HE TB PPDUs with value in TXOP field of HE SIG-A other than UNSPECIFIED, and BSRP Trigger+QoS Null in multiple HE TB PPDUs with value in TXOP field of HE SIG-A other than UNSPECIFIED are used to protect the OFDMA operation. This is used when the TXOP BW is more than 160 MHz.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A first wireless device configured to perform a bandwidth negotiation or bandwidth indication for frame exchange in a TXOP with a second wireless device, comprising:
   a processor; and
   a network interface connected to the processor, wherein the network interface is configured to,
      announce by the first wireless device a channel puncture scheme indicating whether some channels covering a BSS operating bandwidth are punctured or not;
      transmit a frame to the second wireless device indicating a bandwidth for the frame exchange;
      receive a frame from the second wireless device indicating a negotiated bandwidth for the frame exchange; and
      exchange frames with the second wireless device using the negotiated bandwidth;
      wherein the transmitted frame indicates that the announced channels will not be further punctured.

2. The device of claim 1, wherein the bandwidth negotiation is a static bandwidth negotiation.

3. The device of claim 1, wherein the bandwidth negotiation is a dynamic bandwidth negotiation.

4. The device of claim 1, wherein the transmitted frame indicates that the announced channels is further punctured.

5. The device of claim 4, wherein the bandwidth negotiation is a static bandwidth negotiation.

6. The device of claim 4, wherein the bandwidth negotiation is a dynamic bandwidth negotiation.

7. The device of claim 1, wherein when the bandwidth negotiation is a dynamic bandwidth negotiation, the transmitted frame indicates that the announced channels may be further punctured.

8. The device of claim 1, wherein when the bandwidth negotiation is a static bandwidth negotiation, the transmitted frame indicates that the announced channels will not be further punctured.

9. The device of claim 1, wherein one bit of reserved bits in a service field indicates if the bandwidth is 320/160+160 MHz.

10. The device of claim 9, wherein five bits of the reserved bits in the service field indicates the channel puncture scheme using U-SIG coding.

11. The device of claim 9, wherein
   four bits of the reserved bits in the service field indicates the channel puncture scheme,
   for a 80 MHz frame, 4 values are used to indicate one channel being punctured and 1 value is used to indicate one 40 MHz channel being puncture,
   for a 160 MHz frame, 8 values are used to indicate one channel being punctured and 4 values are used to indicate one 40 MHz channel being punctured,
   for a 320 MHz frame with punctured 40 MHz channels or punctured 80 MHz channels, 8 values are used to indicate one 40 MHz channel being punctured and 4 values are used to indicate one 80 MHz channel being punctured,
   for a 320 MHz frame with punctured 120 MHz channels, 12 values are used to indicate 120 MHz being punctured.

12. The device of claim 1,
   wherein eight bits of reserved bits in a service field indicates the channel puncture scheme
   wherein for a bandwidth less than or equal to 160 MHz each bit indicates where a related 20 MHz channel is punctured and for a 320 MHz bandwidth each bit indicates where a related 40 MHz channel is punctured.

13. The device of claim 1,
   wherein the first wireless device announces a specific MAC address to indicate the that the bandwidth is greater than 160 MHz.

14. The device of claim 1,
   wherein the transmitted frame includes an extend control frame with an extended subtype field and the transmitted frame body includes fields to indicate the bandwidth and the channel puncture scheme.

15. The device of claim 1,
   wherein five bits in a duration field with a granularity of 32 us indicates the channel puncture scheme using U-SIG coding.

16. The device of claim 1, wherein
   four bits of a duration field with 16 us granularity indicates the channel puncture scheme,
   for a 80 MHz frame, 4 values are used to indicate one 20 MHz channel being punctured and 1 value is used to indicate one 40 MHz channel being puncture,
   for a 160 MHz frame, 8 values are used to indicate one 20 MHz channel being punctured and 4 values are used to indicate one 40 MHz channel being punctured,
   for a 320 MHz frame with punctured 40 MHz channels or punctured 80 MHz channels, 8 values are used to indicate one 40 MHz channel being punctured and 4 values are used to indicate one 80 MHz channel being punctured,
   for a 320 MHz frame with punctured 120 MHz channels, 12 values are used to indicate 120 MHz being punctured.

17. The device of claim 1,
   wherein eight bits of a duration field with a 256 us granularity indicates the channel puncture scheme
   wherein for a bandwidth less than or equal to 160 MHz each bit indicates where a related 20 MHz channel is punctured and for a 320 MHz bandwidth each bit indicates where a related 40 MHz channel is punctured.

18. A method performed by a first wireless device for bandwidth negotiation or bandwidth indication for frame exchange in a TXOP with a second wireless device, comprising:
   announcing by the first wireless device a channel puncture scheme indicating whether some channels covering a BSS operating bandwidth are punctured or not;
   transmitting a frame to the second wireless device indicating a bandwidth for the frame exchange;
   receiving a frame from the second wireless device indicating a negotiated bandwidth for the frame exchange; and
   exchanging frames with the second wireless device using the negotiated bandwidth;
   wherein one bit of reserved bits in a service field indicates if the bandwidth is 320/160+160 MHz;
   wherein four bits of the reserved bits in the service field indicates the channel puncture scheme,
   wherein for a 80 MHz frame, 4 values are used to indicate one channel being punctured and 1 value is used to indicate one 40 MHz channel being puncture;
   wherein for a 160 MHz frame, 8 values are used to indicate one channel being punctured and 4 values are used to indicate one 40 MHz channel being punctured;
   wherein for a 320 MHz frame with punctured 40 MHz channels or punctured 80 MHz channels, 8 values are used to indicate one 40 MHz channel being punctured and 4 values are used to indicate one 80 MHz channel being punctured; and wherein for a 320 MHz frame with punctured 120 MHz channels, 12 values are used to indicate 120 MHz being punctured.

19. A method performed by a first wireless device for bandwidth negotiation or bandwidth indication for frame exchange in a TXOP with a second wireless device, comprising:

announcing by the first wireless device a channel puncture scheme indicating whether some channels covering a BSS operating bandwidth are punctured or not;

transmitting a frame to the second wireless device indicating a bandwidth for the frame exchange;

receiving a frame from the second wireless device indicating a negotiated bandwidth for the frame exchange; and exchanging frames with the second wireless device using the negotiated bandwidth;

wherein eight bits of reserved bits in a service field indicates the channel puncture scheme; and wherein for a bandwidth less than or equal to 160 MHz each bit indicates where a related 20 MHz channel is punctured and for a 320 MHz bandwidth each bit indicates where a related 40 MHz channel is punctured.

20. A first wireless device configured to perform a bandwidth negotiation or bandwidth indication for frame exchange in a TXOP with a second wireless device, comprising:

a processor; and a network interface connected to the processor, wherein the network interface is configured to, announce by the first wireless device a channel puncture scheme indicating whether some channels covering a BSS operating bandwidth are punctured or not;

transmit a frame to the second wireless device indicating a bandwidth for the frame exchange;

receive a frame from the second wireless device indicating a negotiated bandwidth for the frame exchange; and exchange frames with the second wireless device using the negotiated bandwidth; wherein when the bandwidth negotiation is a dynamic bandwidth negotiation, the transmitted frame indicates that the announced channels is further punctured.

* * * * *